(12) United States Patent
Hamon et al.

(10) Patent No.: US 9,819,425 B2
(45) Date of Patent: Nov. 14, 2017

(54) METHOD AND SYSTEM FOR TESTING BASE STATIONS OF A MOBILE TELECOMMUNICATIONS NETWORK

(71) Applicant: ERCOM ENGINEERING RESEAUX COMMUNICATIONS, Velizy Villacoublay (FR)

(72) Inventors: François Hamon, Marseilles (FR); Yiqi Jiang, Marseilles (FR); The Phuong Nguyen, Caen (FR); Damien Pouessel, Escoville (FR); Frédéric Rible, Orsay (FR)

(73) Assignee: ERCOM ENGINEERING RESEAUX COMMUNICATIONS, Velizy Villacoubl (FR)

( * ) Notice: Subject to any disclaimer, the term of this patent is extended or adjusted under 35 U.S.C. 154(b) by 17 days.

(21) Appl. No.: 14/758,951

(22) PCT Filed: Dec. 6, 2013

(86) PCT No.: PCT/EP2013/075775
§ 371 (c)(1),
(2) Date: Jul. 1, 2015

(87) PCT Pub. No.: WO2014/106561
PCT Pub. Date: Jul. 10, 2014

(65) Prior Publication Data
US 2015/0341809 A1    Nov. 26, 2015

(30) Foreign Application Priority Data

Jan. 4, 2013 (FR) ...................................... 13 50050

(51) Int. Cl.
*H04L 12/28* (2006.01)
*H04B 17/00* (2015.01)
(Continued)

(52) U.S. Cl.
CPC ........ *H04B 17/0087* (2013.01); *H04W 24/06* (2013.01); *H04W 24/10* (2013.01)

(58) Field of Classification Search
CPC ... H04W 24/06; H04B 17/0087; H04B 7/026; H04B 17/3911; H04B 17/102;
(Continued)

(56) References Cited

U.S. PATENT DOCUMENTS

2006/0100841 A1* 5/2006 Wu ........................ H04M 1/24
703/20
2006/0109794 A1   5/2006 Muszynski et al.
(Continued)

FOREIGN PATENT DOCUMENTS

WO    2006/048742 A1    5/2006
WO    2006/085803 A1    8/2006

OTHER PUBLICATIONS

3GPP, "3rd Generation Partnership Project; Technical Specification Group Radio Access Network; Base Station (BS) conformance testing (TDD) (Release 10)," 3rd Generation Partnership Project (3GPP), Mobil Competence Centre, Jul. 4, 2012, Sophia-Antipolis Cedex, France.
(Continued)

*Primary Examiner* — Alex Skripnikov
*Assistant Examiner* — Lionel Preval
(74) *Attorney, Agent, or Firm* — Im IP Law; C. Andrew Im (57) ABSTRACT

A method and system for testing of base stations of a mobile telecommunications network having a plurality of cells. A base station at its antenna is connected to a testing system by a radio frequency cable. Mobile terminals of a cell are emulated. The mobile terminals transmit data and sends/
(Continued)

receives calls within the cell via the base station. A separate channel emulator is provided for each emulated mobile terminal.

18 Claims, 7 Drawing Sheets

(51) Int. Cl.
*H04W 24/10* (2009.01)
*H04W 24/06* (2009.01)

(58) Field of Classification Search
CPC ....... H04B 17/16; H04L 25/022; H04L 43/50; H04L 1/0001; H04L 1/0027; H04L 25/03343; H04L 25/0222; H04M 1/24
See application file for complete search history.

(56) References Cited

U.S. PATENT DOCUMENTS

| | | | | |
|---|---|---|---|---|
| 2006/0233111 | A1* | 10/2006 | Wright | H04B 17/0087 370/241 |
| 2007/0002753 | A1* | 1/2007 | Bailey | H04L 43/50 370/241 |
| 2008/0147370 | A1 | 6/2008 | Sjerling | |
| 2011/0007655 | A1* | 1/2011 | Pauly | H04L 1/0001 370/252 |
| 2011/0194633 | A1* | 8/2011 | Zhang | H04L 25/0222 375/260 |
| 2012/0147930 | A1* | 6/2012 | Miyoshi | H04B 7/026 375/211 |
| 2012/0294272 | A1* | 11/2012 | Han | H04L 1/0027 370/329 |
| 2013/0155867 | A1* | 6/2013 | Asokan | H04W 24/06 370/241 |
| 2013/0208600 | A1* | 8/2013 | Campbell | H04W 24/06 370/241 |
| 2013/0210474 | A1* | 8/2013 | Kyosti | H04B 17/0087 455/517 |

OTHER PUBLICATIONS

"3rd Generation Partnership Project; Technical Specification Group Radio Access Network; Base station (BS) conformance testing (FDD) (Release 10)," 3GPP Standard, 3rd Generation Partnership Project (3GPP), Mobil Competence Centre, Sep. 23, 2012, pp. 1-28, vol. RAN WG4, No. V10.7.0, 20, Sophia-Antipolis Cedex, France.
Recommended Minimum Performance Standards for cdma2000 Spread Spectrum Base Stations, 3rd Generation Partnership Project 2, 3GPP2, Jun. 24, 2010, pp. 1-167, vol. TSGC, No. Version 0.8, Arlington, Virginia, USA.
Speth et al., "Optimum Receiver Design for Wireless Broadband Systems Using OFDM—Part 1," IEEE Transactions on Communications, Nov. 1999, pp. 1668-1677, vol. 47, No. 11.
Tuomaala et al., "Effective SINR approach of link to system mapping OFDM/multi-carier mobile network," Proc. 2nd International Conference on Mobile Technology, Application and Systems, Nov. 15-17, 2005, IEEE.
He et al., "Link Layer Abstraction in MIMOOFDM System," international Workshop on Cross Layer Design, Sep. 20-21, 2007, pp. 41-44, IEEE.
Sandanalakshmi et al., "Effective SNR Mapping for Link Error Prediction in OFDM based Systems," IET-UK International conference on Information and Communication Technology in Electrical Sciences, Dec. 20-22, 2007, pp. 684-687, IET.

\* cited by examiner

METHOD AND SYSTEM FOR TESTING BASE STATIONS OF A MOBILE TELECOMMUNICATIONS NETWORK

RELATED APPLICATIONS

This application is a §371 application from PCT/EP2013/075775 filed Dec. 6, 2013, which claims priority from French Patent Application No. 13 50050 filed Jan. 4, 2013, each of which is herein incorporated by reference in its entirety.

FIELD OF THE INVENTION

The present invention relates to the field of telecommunications.

The present invention relates more particularly to a method and system for emulating mobile terminals in order to test base stations of a mobile telecommunications network.

The present invention applies to so-called "eNodeB" base stations in the context of the fourth generation of mobile telecommunications: LTE or "Long Term Evolution."

BACKGROUND OF THE INVENTION

There is a known prior art application, PCT No. WO 03/069814 (Dyaptive Systems Incorporated), which describes a simulator for mobile terminals in a wireless telecommunications network, for the purpose of testing the base stations.

The effect of Doppler speed on the degradation of the SINR (Signal to Interference plus Noise Ratio) has been addressed in the following publication:

[1] M. Speth, S. Fechtel, G. Fock, H. Meyr, "Optimum Receiver Design for Wireless Broadband Systems Using OFDM—Part 1", IEEE Transactions on Communications, Vol. 47, No. 11, November 1999.

The effect of multipath channels on the compression of the SINR has been addressed in the following publications:

[2] E. Tuomaala and H. Wang, "Effective SINR approach of link to system mapping in OFDM/multi-carrier mobile network", in Mobile Technology, Application and Systems, 2005 $2^{nd}$ International Conference, November 2005.

[3] X. He, K. Niu, Z. He, and J. Lin, "Link Layer Abstraction in MIMOOFDM System," in Proc. International Workshop on Cross Layer Design, 2007.

[4] R. Sandanalakshmi, T. Palanivelu, and K. Manivannan, "Effective SNR Mapping for Link Error Prediction in OFDM based Systems," in Proc. IET-UK International Conference on Information and Communication Technology in Electrical Sciences ICTES, 2007

SUMMARY OF THE INVENTION

The present invention seeks to overcome the disadvantages of the prior art by proposing a method for emulating a large number of mobile terminals in order to the test base stations of a telecommunications network. The present invention makes it possible to reduce the calculation complexity of a multi-mobile channel emulator.

The present invention relates, in its most general sense, "to a method for laboratory testing of base stations of a mobile telecommunications network comprising a plurality of cells, characterized in that it comprises the following steps:

connecting a base station at its antenna to a testing system by means of a radio frequency cable;

emulating mobile terminals of a cell, said mobile terminals transmitting data and sending/receiving calls within said cell via a base station; and in that there is a separate channel emulator for each emulated mobile terminal.

Advantageously, said method applies to base stations of the eNodeB type for networks of the LTE (Long Term Evolution) type.

According to one embodiment, said method implements a plurality of multipath uplink channels based on a single frequency-time transform processor.

Advantageously, said frequency-time transform processor is of the fast Fourier transform type.

According to a variant, said multipath channels are finite impulse response filters whose complex coefficients vary with time.

According to one embodiment, said multipath channels are applied to the so-called frequency domain prior to the frequency-time transform.

Figure 2A:
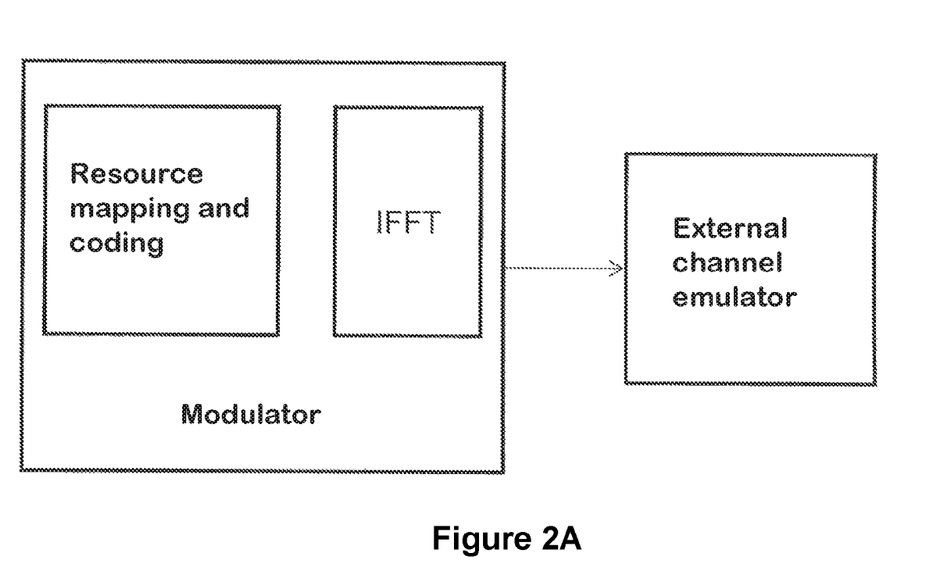
FIG. 2A represents a modulator and an external channel emulator according to the prior art.
Figure 2B:
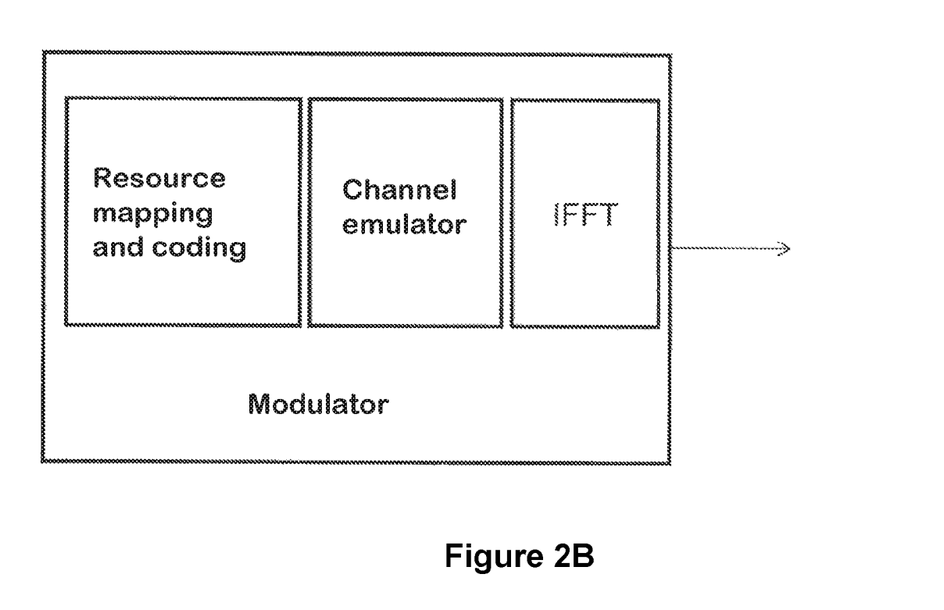
FIG. 2B illustrates a modulator comprising a channel emulator according to the present invention.

Thus, the emulation of the channel is incorporated into the modulator, which is made possible by the OFDMA waveform of LTE (see FIG. 2).

Preferably, said multipath channels are frequency-multiplexed before being applied to the signal transmitted by the mobile terminals.

This frequency-multiplexing step makes it possible to apply a plurality of associated multipath channels to a plurality of mobile terminals using a single vector multiplication operation. If we consider a delay spread of FILTER_SIZE samples, this step of the method makes it possible to obtain a gain of FILTER_SIZE*NB_UES.

According to one embodiment, said method implements an emulation of a plurality of variable distances between the base station and the independent mobile terminals based on a single FFT (Fast Fourier Transform) processor.

Advantageously, the distance simultaneously emulates a propagation time and the weakening of the signal in accordance with a law describing the decrease in the power of the signal.

According to a variant, said distance emulation is implemented in the form of a phase ramp in the frequency domain.

According to a variant, said method implements an emulation of a variation in the Doppler conditions based on a single set of multipath channel implementations, the Doppler speed being induced by the subsampling of this set of multipath channel implementations, and a channel implementation being associated with a delay spread which varies based on the subsampling chosen.

According to a particular embodiment, said method ensures the continuity of the channel by symmetrically transposing the channel implementations, allowing a continuous loopback.

According to one embodiment, said method also comprises a step for compressing the SINR (Signal to Interference plus Noise Ratio), taking into account the Doppler effect, the estimated noise, the fading, and the receiver noise factor.

This method makes it possible to transpose standard block error rate curves under AWGN (additive white Gaussian noise) channel to the block error rate under multipath channel and Doppler conditions. The innovation of this method stems from its implementation described below, and also from the fact that it combines the Doppler effect and the multipath channel in the step for compressing the SINR (see FIGS. 2 and 3).

Advantageously, said method is implemented based on an LUT (Look-Up Table) for the emulation of the SINR (Signal to Interference plus Noise Ratio) compression in order to calculate the downlink BLER (Block Error Rate) and downlink CQI (Channel Quality Indicator).

According to one embodiment, said method comprises a step for emulating a downlink MIMO (Multiple-Input Multiple-Output) LTE (Long Term Evolution) channel by interacting with the returned CQI (Channel Quality Indicator), RI (Rank Indicator), PMI (Precoding Matrix Index) and BLER (Block Error Rate) information.

According to one embodiment, in order to obtain CQIs (Channel Quality Indicators), in each iteration, the pair $\alpha_1$, $\alpha_2$ from the previous iteration is used, and the N adjacent pairs $\alpha_1$, $\alpha_2$ are tested, the best of these N pairs being used as the base pair in the next iteration, the EESM expression $$SINR^i_{\mathit{eff}} = -\alpha_1 \ln\left(\frac{1}{N_{bl}} \sum_{n=0}^{N_{bl}-1} \exp\left(-\frac{SINR^i[k]}{\alpha_2}\right)\right)$$

using N pairs of values $\alpha_1$, $\alpha_2$ associated with N CQIs (Channel Quality Indicators), said EESM expression converging on the correct value if it has been calculated with the correct pairs of values of $\alpha_1$, $\alpha_2$.

Thus, the complexity of the calculation is limited to the testing of (N<<15) pairs and the algorithm is expected to converge on the optimal pair.

According to a variant, said method also comprises a step for the coherent propagation of the parameters Tx power (transmission power), Tx fading (fading during transmission), CQI (Channel Quality Indicator), PMI (Precoding Matrix Index), RI (Rank Indicator), Doppler, and downlink BLER (Block Error Rate) based on a "delay line"-type channel model and on a distance profile.

Advantageously, said method implements an uplink power dynamic in a respective digital/analog partition of the dynamic specific to said mobile terminals and the dynamic specific to a cell.

The present invention also relates to a system for the laboratory testing of base stations of a mobile telecommunications network comprising a plurality of cells, characterize in that it comprises means for:
  connecting a base station at its antenna to said testing system by means of a radio frequency cable;
  emulating mobile terminals of a cell, said mobile terminals transmitting data and sending/receiving calls within said cell via a base station; and
  having a separate channel emulator for each emulated mobile terminal.

BRIEF DESCRIPTION OF THE DRAWINGS

The invention will be more clearly understood with the help of the description, given below as a purely explanatory example, of an embodiment of the invention in reference to the Figures, in which.

DETAILED DESCRIPTION OF THE EMBODIMENTS OF THE INVENTION

Figure 1:
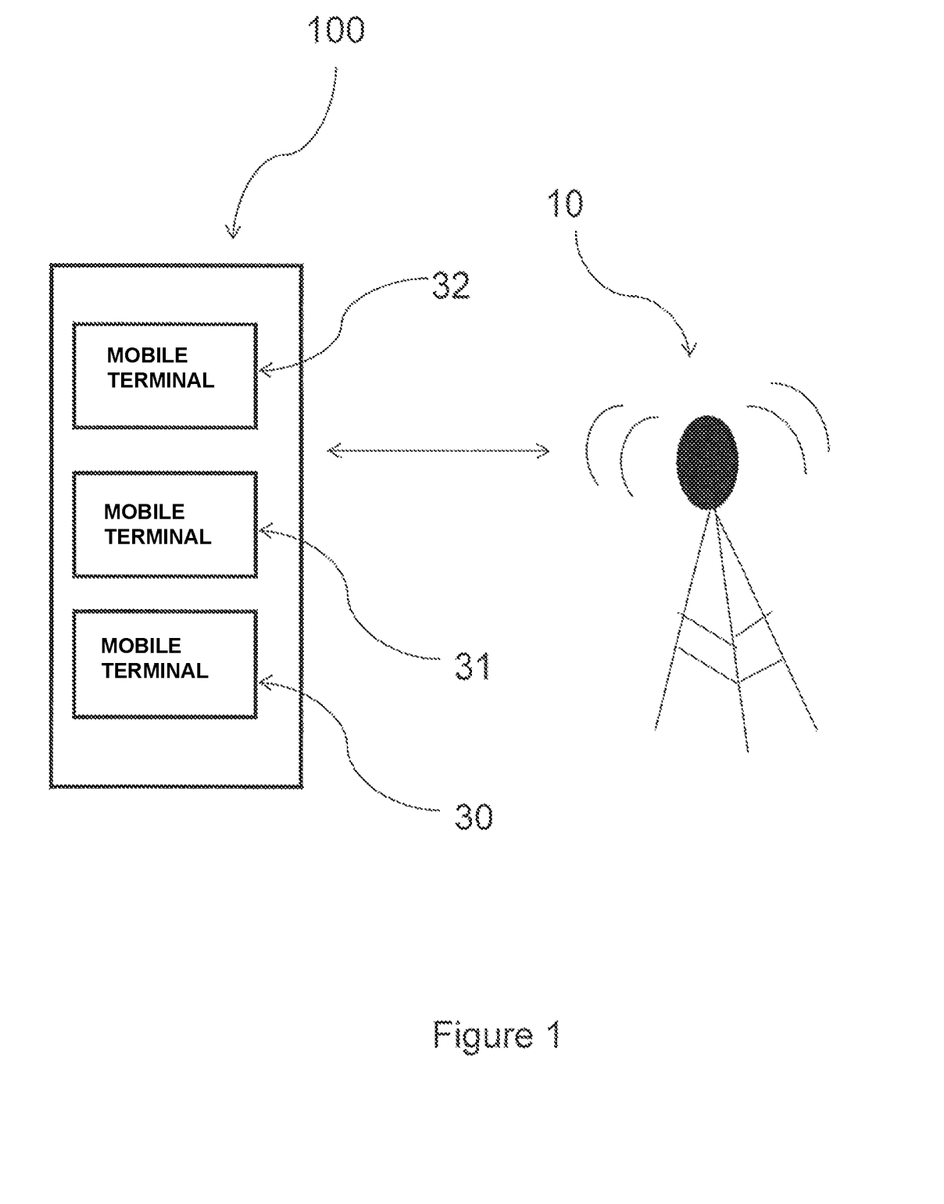
FIG. 1 illustrates the system according to the present invention in one embodiment.

The system 100 and the method according to the present invention make it possible to emulate several hundred LTE-compatible mobile terminals 30, 31, 32.

According to the invention, the method makes it possible to laboratory test base stations 10, 11, 12 of a mobile telecommunications network 20 comprising a plurality of cells 40, 41, 42.

The method according to the present invention comprises the following steps:
  connecting a base station 10 at its antenna 50 to a testing system 100 by means of a radio frequency cable 60;
  emulating mobile terminals 30, 31, 32 of a cell 40, said mobile terminals 30, 31, 32 transmitting data and sending/receiving calls within said cell 40 via a base station 10.

There is a separate channel emulator for each emulated mobile terminal.

The emulated mobile terminals 30, 31, 32 stimulate a load in the base station 10: they send calls and transmit data, particularly by means of a Voice over Internet Protocol (VoIP). La base station 10 is thus stimulated in the laboratory as it would be in a real environment.

The emulated mobile terminals 30, 31, 32 are contained in a chassis 80.

The method seeks to emulate the reality of the radio environment. It simulates buildings and the movements of the mobile terminals 30, 31, 32 (for example inside an automobile or carried by a walking pedestrian).

The system 100 and the method according to the present invention make it possible to simulate:
  a multipath channel model
  a (wave) propagation model
  a Doppler model (related to mobility).

The system 100 and the method according to the present invention make it possible to represent a realistic environment, taking into account the speed of the mobile terminals 30, 31, 32, their distance from the base station 10, and the environment (buildings, etc.)

FIG. 1 illustrates the system 100 according to the present invention: a base station 10 communicates with emulated mobile terminals 30, 31, 32.

The system 100 according to the present invention makes it possible to laboratory test base stations 10, 11, 12 of a mobile telecommunications network 20 comprising a plurality of cells 40, 41, 42. This system 100 comprises means for:
  connecting a base station 10 at its antenna 50 to said testing system 100 by means of a radio frequency cable 60; and
  emulating mobile terminals 30, 31, 32 of a cell 40, said mobile terminals 30, 31, 32 transmitting data and sending/receiving calls within said cell 40 via a base station 10.

FIG. 2A represents a modulator and an external channel emulator according to the prior art.

FIG. 2B illustrates a modulator comprising a channel emulator according to the present invention.

Figure 3:
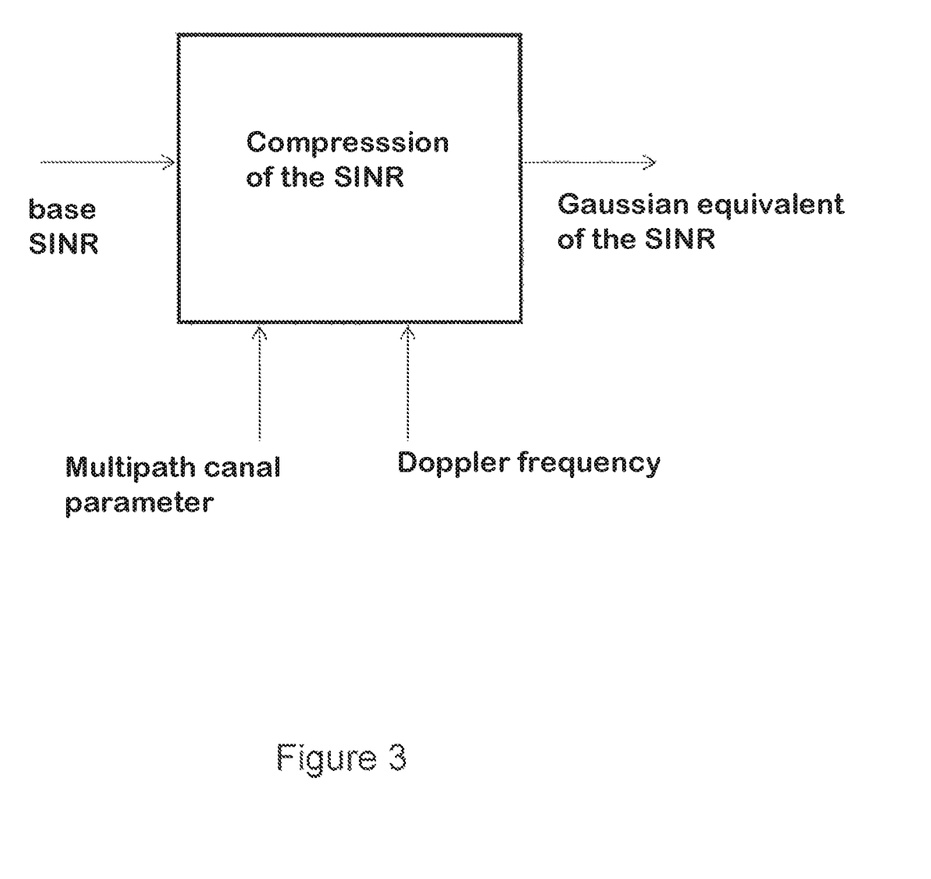
FIGS. 3 and 4 represent the step for compressing the SINR (Signal to Interference plus Noise Ratio), in the context of the method according to the present invention.
Figure 4:
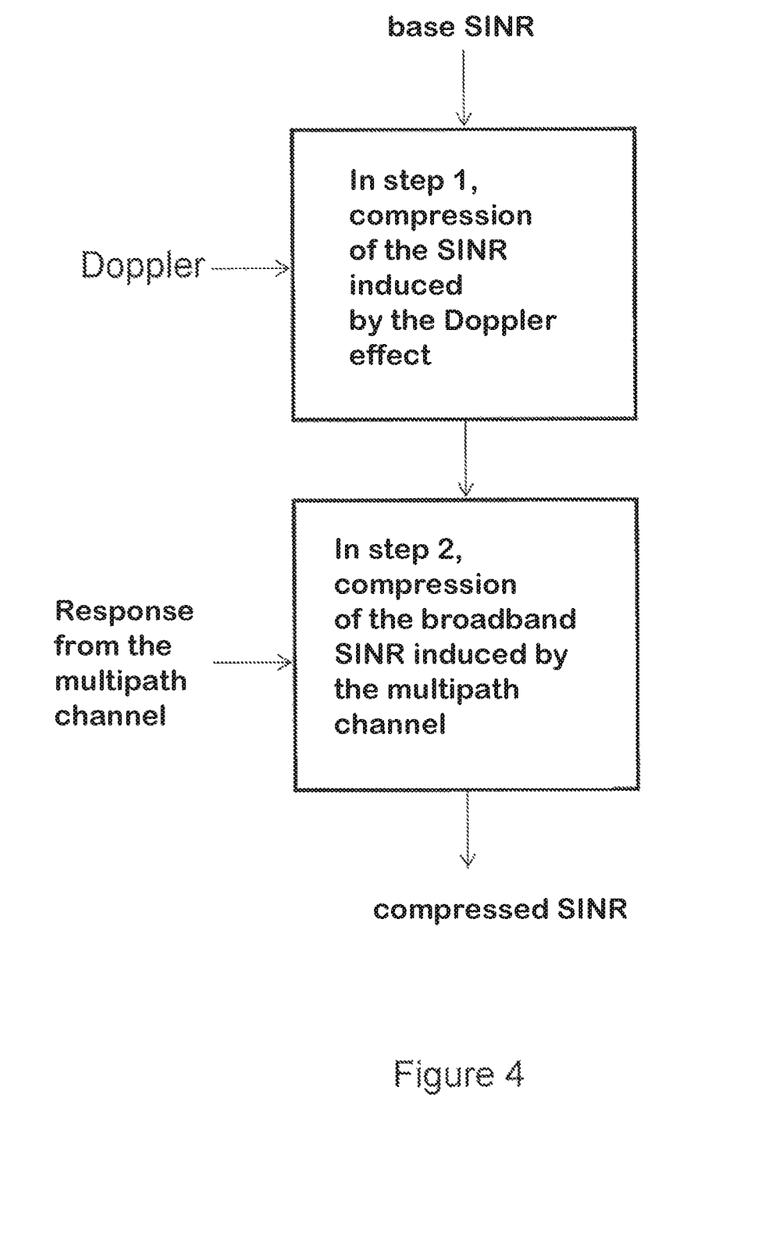

FIGS. 3 and 4 represent the step for compressing the SINR (Signal to Interference plus Noise Ratio), in the context of the method according to the present invention.

Figure 5:
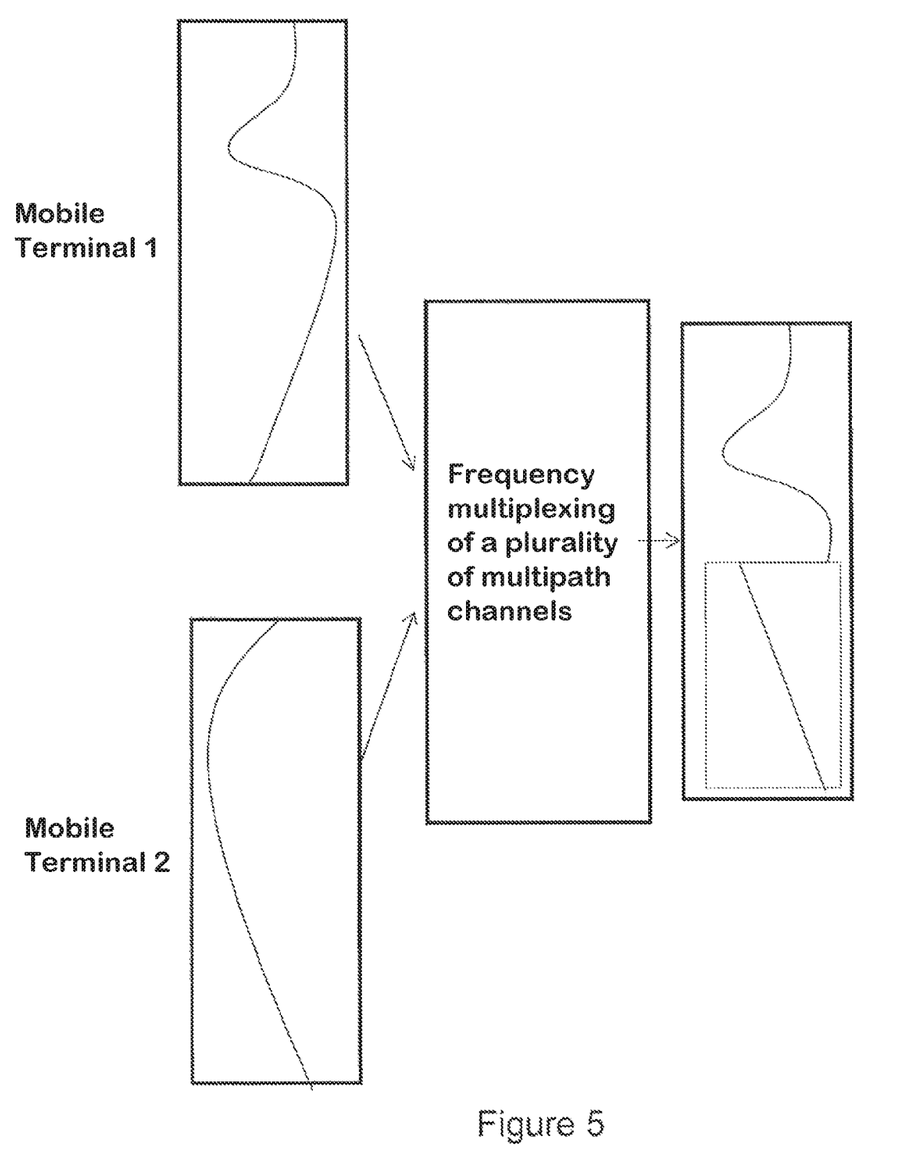
FIG. 5 illustrates the frequency-multiplexing of a plurality of multipath channels in the context of the method according to the present invention.

FIG. 5 illustrates the frequency-multiplexing of a plurality of multipath channels, in the context of the method according to the present invention.

Figure 6:
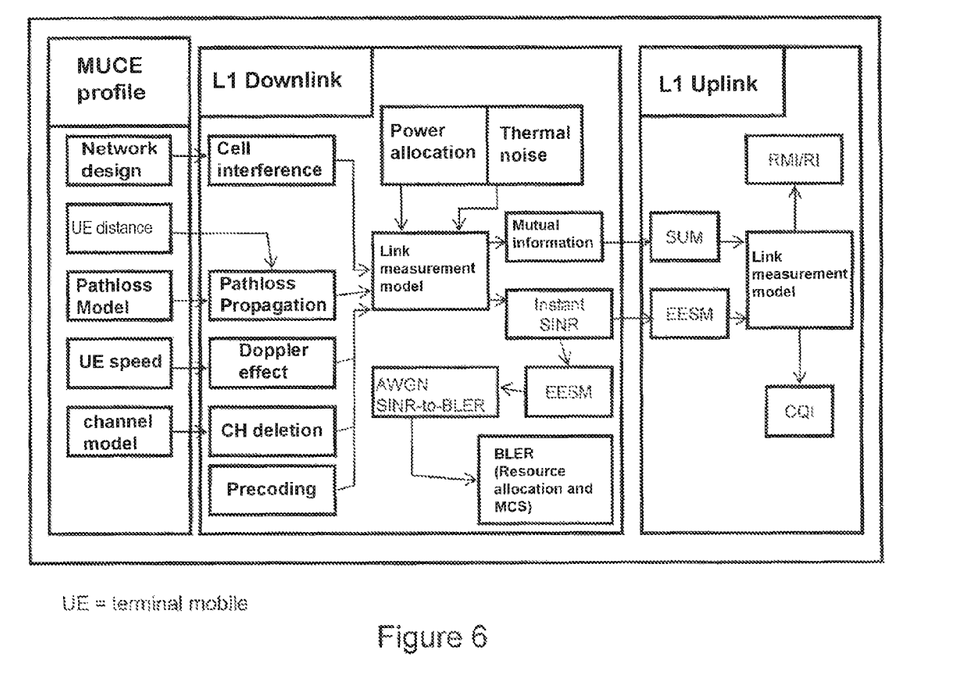
FIGS. 6 and 7 represent the system according to the present invention in one embodiment.
Figure 7:
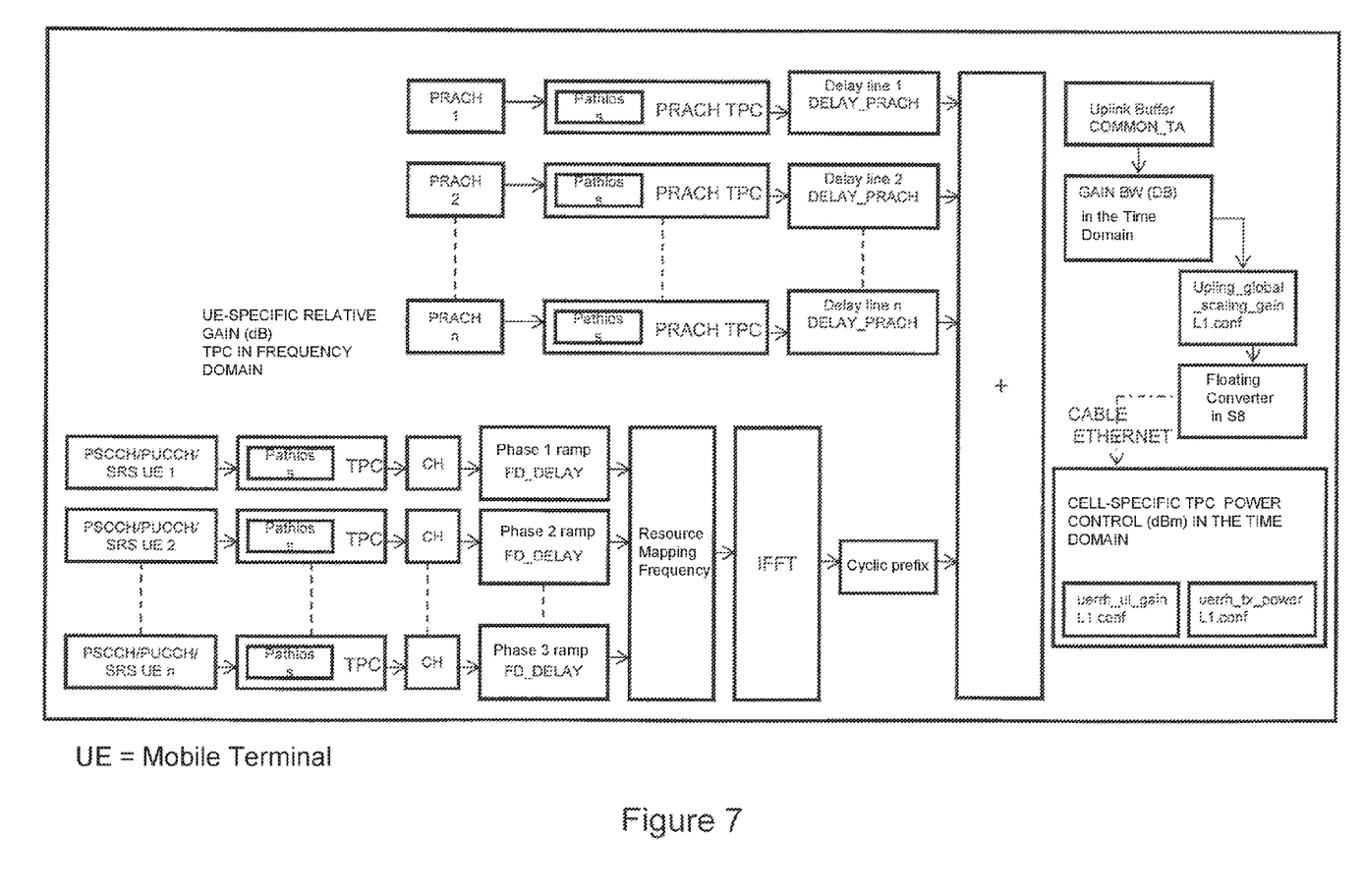

FIGS. 6 and 7 represent the system according to the present invention in one embodiment.

In the system according to the present invention, there is a separate channel emulator for each emulated mobile terminal. Thus, for each emulated mobile terminal, a different channel is detected. The system according to the invention accounts for the possible presence of buildings (and associated signal reflections) and the distance from each terminal mobile to the base station. This makes it possible to represent a realistic environment.

In one embodiment, the same IFFT-type function is shared by all of the emulated mobile terminals.

In one embodiment, the same FFT-type function is shared by of the emulated mobile terminals.

Uplink

In one embodiment, a plurality of channel responses is applied to the frequency domain, taking advantage of the fact that in LTE, the resources used by the users are on orthogonal frequencies, and a term-by-term multiplication is applied prior to the application of an IFFT-type function.

The method implements a plurality of multipath uplink channels based on a single FFT (Fast Fourier Transform) processor.

This is done by "mapping" the various channels.

In one embodiment, for each user, the responses to the initialization of the system are stored, in the presence of a Doppler effect.

The instances of the channel that correspond to the slowest speed to be emulated are stored in memory. The storage is performed so as to provide sufficient channel statistics.

In a particular implementation, fifty coherence times are stored.

In one embodiment, the Doppler effect is emulated thanks to a sub-sampling of the channel. This sub-sampling is performed based on the mobile terminal speed that has been parameterized.

In one embodiment, the method according to the present invention ensures the continuity of the channel by symmetrically transposing the channel implementations.

In one embodiment, the method according to the present invention implements an uplink power dynamic in a respective digital/analog partition of the dynamic specific to said mobile terminals (30, 31, 32) and the dynamic specific to a cell (40).

Downlink

In one embodiment, information returned by the mobile terminal to the base station is used so that the latter can make decisions. The channel is then emulated by disregarding the physical channel and by emulating the measurements returned to the base station (eNodeB). From the channel implementations, the method seeks to model the parameters expected to be returned by the mobile terminal to the base station (eNodeB). Among these parameters are BLER (Block Error Rate), CQI (Channel Quality Indicator), PMI (Precoding Matrix Index) and RI (Rank Indicator). These parameters are directly dependent on the channel, and make it possible to model said downlink channel.

In one embodiment, the method according to the present invention is implemented based on an LUT (Look-Up Table) for the emulation of the compression of the SINR (Signal to Interference plus Noise Ratio) in order to calculate the downlink BLER (Block Error Rate) and downlink CQI (Channel Quality Indicator).

In one embodiment, said method also comprises a step for compressing the SINR (Signal to Interference plus Noise Ratio), taking into account the Doppler effect, the estimated noise, the fading, and the receiver noise factor.

This method makes it possible to transpose standard block error rate curves under AWGN (additive white Gaussian noise) channel to the block error rate under multipath channel and Doppler conditions. The innovation of this method stems from its implementation described below, and also from the fact that it combines the Doppler effect and the multipath channel in the step for compressing the SINR (see FIGS. 2 and 3).

In a first step (FIG. 3), the SINR is compressed in order to account for the Doppler speed.

The SINR compression induced by the Doppler effect may be expressed according to the following formula [1] in the particular case of an SISO transmission:

$$SINR = \frac{P_S \times A_{pathloss}}{\frac{1}{|H_{00}|^2}(P_N + P_{ICI})} =$$

$$\frac{P_S \times A_{pathloss}}{\frac{1}{|H_{00}|^2}\left(P_N + \frac{P_S \times A_{pathloss}}{A_{dop}}\right)} = \frac{|H_{00}|^2}{\left(\frac{P_N}{P_S \times A_{pathloss}} + \frac{1}{A_{dop}}\right)}$$

Where A is expressed as follows:

$$SIR = \frac{1}{\frac{\pi^2}{6}\left(\frac{f_{doppler}}{\Box f}\right)^2} = A_{dop}$$

Ps is the power of the signal, PN is the power of the thermal noise, and H00 is the subcarrier channel gain. This expression may be extrapolated to the case of a MIMO transmission using the following formula:

$$SINR_i =$$

$$\frac{P_S \times A_{pathloss}}{\sum_{j=0}^{N_r-1}|Q_{ij}|^2\left(P_N + \frac{P_S \times A_{pathloss}}{A_{dop}}\right)} = \frac{1}{\sum_{j=0}^{N_r-1}|Q_{ij}|^2\left(\frac{P_N}{P_S \times A_{pathloss}} \frac{1}{A_{dop}}\right)}$$

Where $$Q_{v \times N_r} = inv(HW) = ((HW)^H(HW))^{-1}(HW)^H = (W^H H^H HW)^{-1}(W^H H^H)$$

W being the precoding matrix defined in the specification 3GPP TS36211.

In order to reduce the complexity induced by these methods, the present invention proposes to pre-calculate and store in an LUT (Look-Up Table) the following terms:

$$\sum_{j=0}^{N_r-1} |Q_{ij}|^2$$

For each multipath channel implementation.

In a second step, the method known as "Exponential Effective Signal to Interference and Noise Ratio Mapping" (EESM) (described in documents [2][3][4] cited above) is used to compress the SINR.

$$SINR^i_{\mathit{eff}} = -\alpha_1 \ln\left(\frac{1}{N_{bl}} \sum_{n=0}^{N_{bl}-1} \exp\left(-\frac{SINR^i[k]}{\alpha_2}\right)\right)$$

where i is the OFDM time index, k is the index of the subcarrier, $N_{bl}$ is the total number of subcarriers to be averaged (in time i and in frequency k), $\alpha_1$, $\alpha_2$ are the calibration parameters.

In order to reduce the complexity of the second step, the present invention proposes the following method:

- Replacing the calculation of the Log exponential sum by the Jacobian algorithm with the additive correction term stored in an LUT.
- Averaging the channel by reducing the calculation of the current SINRs for each subcarrier and each time index to one SINR per subcarrier and time index subset.
- Calculating the SINRs simultaneously by using one or more "threads" per mobile terminal, The number of mobile terminals processed each millisecond is equal to two or more times the number of CPUs available for the system.

In one embodiment, the method according to the present invention comprises a step for emulating an LTE (Long Term Evolution) MIMO (Multiple-Input Multiple-Output) downlink channel by interacting with the returned CQI (Channel Quality Indicator), RI (Rank Indicator), PMI (Precoding Matrix Index) and BLER (Block Error Rate) information.

To calculate the (Precoding Matrix Index), a prior art method based on the calculation of the mutual information [2][3][4] described below is used:

$$W_{selected} = \arg\max_{W_i \in codebook} \sum_{k=1}^{K} \sum_{n=1}^{N} I_{(k,n)}(W_i) \quad (1)$$

$$I_{(k,n)}(W_i) = \log 2 \det(I_{Nlayer} + \rho W_i^H H_{k,n}^H H_{k,n} W_i) \quad (2)$$

In order to reduce the complexity of the calculation, this implementation proposes to pre-calculate and store in an LUT (Look-Up Table) the following elements:

$$I_{(k,n)}(W_i) = \log 2\det(I_{Nlayer} + \rho W_i^H H_{k,n}^H H_{k,n} W_i) = \log 2(1+\rho^2(e_0 e_3 - e_1^2 - e_2^2) + \rho(e_0+e_3)) \quad (3)$$

where $e_0 e_3 - e_1^2 - e_2^2$ and $e_0+e_3$ may be stored as real scalar values.

With:

$$W_i^H H_{k,n}^H H_{k,n} W_i = \begin{bmatrix} e_0 & e_2 \\ e_1 & e_3 \end{bmatrix}$$

Furthermore, in order to avoid using the K*N log 2 calculation expressed in (1), the arguments of (3) are factored using the expression $\log_2(x*y)=\log_2(x)+\log_2(y)$. This makes it possible to replace evaluations of log 2 functions with multiplications.

The EESM expression $$SINR^i_{\mathit{eff}} = -\alpha_1 \ln\left(\frac{1}{N_{bl}} \sum_{n=0}^{N_{bl}-1} \exp\left(-\frac{SINR^i[k]}{\alpha_2}\right)\right)$$

uses N pairs of values $\alpha_1$, $\alpha_2$ which are associated with N CQIs (Channel Quality Indicators). This expression converges on the correct value if it has been calibrated with the correct pairs of values of $\alpha_1$, $\alpha_2$.

In the prior art, we proceed as follows: in order to obtain the correct CQI, the pairs °, ° are tested in decreasing order of their associated CQI value. We search for the highest value for which the SINReff guarantees that BLER is less than 0.1, so in the worst case, it takes fifteen attempts, corresponding to the fifteen CQIs of LTE, to find it.

In the context of the present invention, we proceed as follows: in each iteration, the pair $\alpha_1$, $\alpha_2$ from the previous iteration is used and the N adjacent pairs $\alpha_1$, $\alpha_2$ are tested. The best of these N pairs will be used as the base pair in the next iteration. Thus, the calculation complexity is limited to the testing of (N<<15) pairs and the algorithm is expected to converge on the optimal pair.

The invention is described above by way of example. It is understood that a person skilled in the art is capable of producing different variants of the invention without going outside the scope of the patent.

The invention claimed is:

1. Method for testing of base stations of a mobile telecommunications network comprising a plurality of cells, comprising the steps of:
    connecting a base station at its antenna to a testing system by a radio frequency cable;
    emulating mobile terminals of a cell, the mobile terminals transmit data and send/receive calls within the cell via the base station;
    obtaining channel quality indicators, in each iteration, by utilizing a pair $\alpha_1$, $\alpha_2$ from a previous iteration, and testing N adjacent pairs $\alpha_1$, $\alpha_2$, best of the N pairs is used as a base pair in a next iteration,
    an exponential effective signal to interference and noise ratio mapping (EESM) expression $$SINR^i_{\mathit{eff}} = -\alpha_1 \ln\left(\frac{1}{N_{bl}} \sum_{n=0}^{N_{bl}-1} \exp\left(-\frac{SINR^i[k]}{\alpha_2}\right)\right)^n$$

using N pairs of values $\alpha_1$, $\alpha_2$ associated with N channel quality indicators, the EESM expression converging on a correct value in response to calculation with correct pairs of values of $\alpha_1$, $\alpha_2$;
    wherein i is an Orthogonal Frequency Division Multiplexing (OFDM) time index,
    k is a subcarrier index,
    $N_{bl}$ is a total number of subcarriers to be averaged,
    $\alpha_1$, $\alpha_2$, are calibration parameters; and
    wherein a separate channel emulator is provided for each emulated mobile terminal.

2. Method according to claim 1, wherein base stations of eNodeB type for Long Term Evolution networks are connected to the testing system.

3. Method according claim 1, further comprising the step of implementing a plurality of multipath uplink channels based on a single frequency-time transform processor.

4. Method according to claim 3, wherein the single frequency-time transform processor is a fast Fourier transform type processor.

5. Method according to claim 3, wherein the multipath uplink channels are finite impulse response filters whose complex coefficients vary with time.

6. Method according to claim 3, further comprising the step of applying the multipath channels to a frequency domain prior to a frequency-time transform.

7. Method according to claim 3, further comprising the step of frequency multiplexing the multipath uplink channels before a signal is transmitted by the mobile terminals.

8. Method according to claim 1, further comprising the step of emulating a plurality of variable distances between the base station and the mobile terminals based on a single Fast Fourier Transform processor.

9. Method according to claim 8, wherein each variable distance simultaneously emulates a propagation time and weakening of a signal in accordance with a decrease in a power of the signal.

10. Method according to claim 8, further comprising step of emulating the plurality of variable distances in a form of a phase ramp in a frequency domain.

11. Method according to claim 1, further comprising the step of emulating a variation in Doppler conditions based on a single set of multipath channel implementations, a Doppler speed being induced by a sub-sampling of the single set of multipath channel implementations, and a channel implementation being associated with a delay spread which varies based on a selected sub-sampling.

12. Method according to claim 1, further comprising the step of symmetrically transposing channel implementations to ensure a continuity of a channel to allow a continuous loopback.

13. Method according to claim 1, further comprising the step of compressing a Signal to Interference plus Noise Ratio in accordance with a Doppler effect, an estimated noise, a fading, and a receiver noise factor.

14. Method according to claim 1, further comprising the step of emulating based on a Look-Up Table of an emulation of Signal to Interference plus Noise Ratio compression for calculating a downlink block error rate and a downlink channel quality indicator.

15. Method according to claim 1, further comprising the step of emulating a downlink multiple-input multiple-output Long Term Evolution channel by interacting with a returned channel quality indicator, a rank indicator, precoding matrix index and block error rate information.

16. Method according to claim 1, further comprising the step of coherently propagating the following parameters: a transmission power, a fading during transmission, a channel quality indicator, a pre-coding matrix index, a rank indicator, a Doppler, and a downlink block error rate based on a delay line type channel model and on a distance profile.

17. Method according to claim 1, further comprising the step of implementing an uplink power dynamic in a respective digital/analog partition of a dynamic specific to the mobile terminals and a dynamic specific to a cell.

18. Testing system for testing of base stations of a mobile telecommunications network comprising a plurality of cells, comprising:
a radio frequency cable to connect a base station at its antenna to the testing system;
an emulator to emulate mobile terminals of a cell, the mobile terminals transmit data and send/receive calls within the cell via the base station to obtain channel quality indicators, in each iteration, by utilizing a pair $\alpha_1, \alpha_2$ from a previous iteration, and to test N adjacent pairs $\alpha_1, \alpha_2$, best of the N pairs is used as a base pair in a next iteration, an exponential effective signal to interference and noise ratio mapping (EESM) expression $$SINR_{eff}^i = -\alpha_1 \ln\left(\frac{1}{N_{bl}} \sum_{n=0}^{N_{bl}-1} \exp\left(-\frac{SINR^i[k]}{\alpha_2}\right)\right)^n$$

using N pairs of values $\alpha_1, \alpha_2$ associated with N channel quality indicators, the EESM expression converging on a correct value in response to calculation with correct pairs of values of $\alpha_1, \alpha_2$;
wherein i is an Orthogonal Frequency Division Multiplexing (OFDM) time index,
k is a subcarrier index,
$N_{bl}$ is a total number of subcarriers to be averaged,
$\alpha_1, \alpha_2$, are calibration parameters; and
wherein a separate channel emulator is provided for each emulated mobile terminal.

* * * * *